(12) United States Patent
Lee et al.

(10) Patent No.: US 12,355,522 B2
(45) Date of Patent: Jul. 8, 2025

(54) METHOD AND APPARATUS FOR TRANSMITTING CHANNEL STATE INFORMATION

(71) Applicant: SAMSUNG ELECTRONICS CO., LTD., Suwon-si (KR)

(72) Inventors: Junho Lee, Suwon-si (KR); Jaein Kim, Suwon-si (KR); Huiwon Je, Suwon-si (KR); Hyunseung Joo, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 97 days.

(21) Appl. No.: 18/482,468

(22) Filed: Oct. 6, 2023

(65) Prior Publication Data

US 2024/0129004 A1  Apr. 18, 2024

(30) Foreign Application Priority Data

Oct. 7, 2022 (KR) .......................... 10-2022-0129035
Jan. 12, 2023 (KR) .......................... 10-2023-0004977

(51) Int. Cl.
*H04B 7/0456* (2017.01)
*H04B 17/391* (2015.01)
(Continued)

(52) U.S. Cl.
CPC ......... *H04B 7/046* (2013.01); *H04B 17/3913* (2015.01); *H04L 5/0048* (2013.01); *H04L 25/0254* (2013.01)

(58) Field of Classification Search
CPC .. H04B 7/0626; H04B 7/0456; H04B 7/0658; H04B 7/06; H04B 7/0417; H04B 7/0413;
(Continued)

(56) References Cited

U.S. PATENT DOCUMENTS 11,387,880 B2   7/2022 Zeng et al.
12,001,943 B2 * 6/2024 Wang .................... H04W 24/02
(Continued)

OTHER PUBLICATIONS

ETSI TS 138 212 V16.10.0 (Jul. 2022), 3GPP TS 38.212 version 16.10.0 Release 16, "5G; NR; Multiplexing and channel coding", 156 Pages.
(Continued)

*Primary Examiner* — Eva Y Puente
(74) *Attorney, Agent, or Firm* — MORGAN, LEWIS & BOCKIUS LLP

(57) ABSTRACT

An operating method of a wireless communication device includes receiving a reference signal from a base station, estimating a first channel between the wireless communication device and the base station based on the reference signal, extracting, based on a first artificial intelligence model trained to reduce a difference between the first channel estimated by the wireless communication device and a second channel estimated by the base station, a feature including grouped attributes from the first channel, quantizing the grouped attributes using a codebook that is based on a second artificial intelligence model and by generating one or more indices of the codebook for each group of the attributes, and transmitting, to the base station, a bitstream including combination information of the indices of the codebook.

20 Claims, 16 Drawing Sheets

(51) Int. Cl.
*H04L 5/00* (2006.01)
*H04L 25/02* (2006.01)

(58) Field of Classification Search
CPC .. H04B 7/0617; H04B 7/0639; H04B 17/318; H04L 25/0254; H04L 5/0048; H04L 1/0026; H04L 5/0051; H04L 41/0686; H04L 5/0053; H04L 5/0057; H04L 47/2475; H04W 24/02; H04W 72/23; H04W 28/06; H04W 24/08; H04W 24/10; H04W 24/04; H04W 4/029; H04W 64/00; H04W 12/065
See application file for complete search history.

(56) References Cited

U.S. PATENT DOCUMENTS

| | | | |
|---|---|---|---|
| 2018/0076871 A1 | 3/2018 | Rahman et al. | |
| 2020/0366537 A1 | 11/2020 | Wang et al. | |
| 2021/0091838 A1 | 3/2021 | Bai et al. | |
| 2021/0195462 A1* | 6/2021 | Pezeshki | H04W 72/23 |
| 2021/0273707 A1 | 9/2021 | Yoo et al. | |
| 2022/0070822 A1 | 3/2022 | Behboodi et al. | |
| 2022/0094411 A1 | 3/2022 | Yoo et al. | |
| 2022/0150727 A1 | 5/2022 | Pezeshki et al. | |
| 2022/0245527 A1 | 8/2022 | Choi et al. | |
| 2024/0171428 A1* | 5/2024 | Hu | H04L 25/0226 |
| 2024/0275440 A1* | 8/2024 | Xi | H04B 7/0482 |
| 2024/0405821 A1* | 12/2024 | Kadambar | H04B 7/0626 |

OTHER PUBLICATIONS

ETSI TS 138 212 V17.2.0 (Jul. 2022), 3GPP TS 38.212 version 17.2.0 Release 17, "5G; NR; Multiplexing and channel coding", 206 pages.
ETSI TS 138 214 V16.10.0 (Jul. 2022), 3GPP TS 38.214 version 16.10.0 Release 16, "5G; NR; Physical layer procedures for data", 178 pages.
ETSI TS 138 214 V17.2.0 (Jul. 2022), 3GPP TS 38.214 version 17.2.0 Release 17, "5G; NR; Physical layer procedures for data", 235 pages.
Extended European Search Report dated Feb. 14, 2024 in related European Patent Application No. 23202260.8 (10 pages).

* cited by examiner

METHOD AND APPARATUS FOR TRANSMITTING CHANNEL STATE INFORMATION

CROSS-REFERENCE TO RELATED APPLICATION

This application is based on and claims priority to and benefit under 35 U.S.C. § 119 to Korean Patent Application No. 10-2022-0129035, filed on Oct. 7, 2022, and Korean Patent Application No. 10-2023-0004977, filed on Jan. 12, 2023, in the Korean Intellectual Property Office, the contents of which are incorporated by reference herein in their entirety.

BACKGROUND

The present disclosure relates to a method and apparatus for transmitting channel state information.

The next-generation communication systems, such as new radio (NR) communication systems, have been developed to match the increasing use of wireless data traffic due to commercialization of long-term evolution (LTE) communication systems and an increase in multimedia services. In some cases, communication is possible performed in a wide range of the entire band in the NR communication systems.

For example, a base station (BS) may transmit a reference signal to user equipment (UE) to find channel information between the BS and the UE. For example, the BS may transmit a channel state information-reference signal (CSI-RS) to find channel information between the BS and the UE. The UE may identify a channel between the BS and the UE based on the CSI-RS received from the BS. Further, the UE may report feedback information about the estimated channel, to the BS. For example, feedback information may include a precoding matrix indicator (PMI), a rank indicator (RI), and a channel quality indicator (CQI). A BS may design a precoder for a downlink channel by using the feedback information.

In some cases, the communication system may transmit a compressed feedback information to a BS using uplink resources which results in limited performance (i.e., a limited performance of the compressed channel information). Therefore, there is a need in the art for systems and method of transmitting information about a channel estimated by UE, by efficiently using uplink resources, to a BS.

SUMMARY

The present disclosure provides a method and apparatus for wireless communication. Embodiments of the present disclosure include a wireless communication device configured to transmit channel state information.

According to an aspect of the present disclosure, a method of a wireless communication device is provided that includes receiving a reference signal from a base station, estimating a first channel between the wireless communication device and the base station based on the reference signal; extracting, based on a first artificial intelligence model trained to reduce a difference between the first channel estimated by the wireless communication device and a second channel estimated by the base station, a feature including grouped attributes from the first channel, quantizing the grouped attributes using a codebook that is based on the second artificial intelligence model and by generating one or more indices of the codebook for each group of the attributes; and transmitting, to the base station, a bitstream including combination information of the indices of the codebook. The codebook may include a plurality of vector codewords and a plurality of scalar codewords, and the second artificial intelligence model may include an artificial intelligence model trained to reduce a difference between a combination of the plurality of vector codewords and the plurality of scalar codewords of the codebook and the quantized attributes.

According to another aspect of the present disclosure, there is provided a method of a wireless communication device, the method including receiving a reference signal from a base station, estimating a first channel between the wireless communication device and the base station based on the reference signal, extracting, based on a first artificial intelligence model trained to reduce a difference between the first channel estimated by the wireless communication device and a second channel estimated by the base station, a feature including grouped attributes from the first channel, generating one or more indices of the codebook for each group of the attributes by quantizing the attributes using a codebook that is based on a second artificial intelligence model, and transmitting, to the base station, a bitstream including the indices of the codebook. The codebook may include a plurality of vector codewords, and the second artificial intelligence model may include an artificial intelligence model trained to reduce a difference between a combination of the plurality of vector codewords of the codebook and the quantized attributes.

According to another aspect of the present disclosure, there is provided a method of a base station, the method including: receiving, from a wireless communication device, a bitstream including information about one or more codebook indices about quantized grouped attributes; by the base station, segmenting the bitstream using a second artificial intelligence model and extracting the quantized attributes from the segmented bitstream using a codebook that is based on the second artificial intelligence model; and obtaining, by the base station, the second channel from the quantized attributes by using a first artificial intelligence model for reducing a difference between the first channel estimated by the wireless communication device and the second channel estimated by the base station with respect to the first channel. The codebook may include a plurality of vector codewords and a plurality of scalar codewords, and the second artificial intelligence model may include an artificial intelligence model for reducing a difference between a combination of the plurality of vector codewords and the plurality of scalar codewords of the codebook and the quantized attributes.

Other features and aspects will be apparent from the following detailed description, the drawings, and the claims.

BRIEF DESCRIPTION OF THE DRAWINGS

Embodiments of the present disclosure can be understood from the following detailed description taken in conjunction with the accompanying drawings.

DETAILED DESCRIPTION

Figure 1:
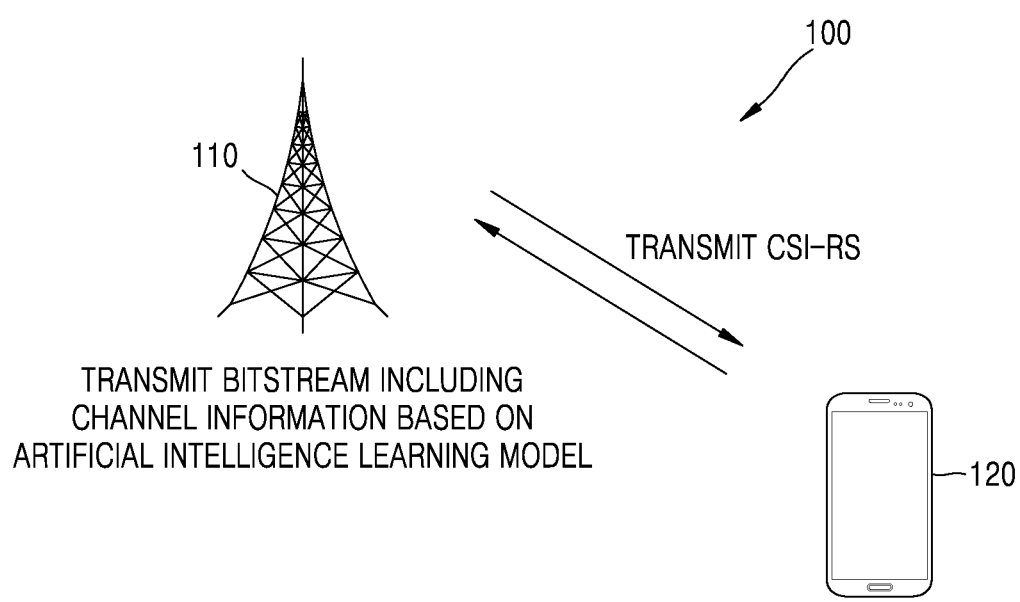
FIG. 1 illustrates a signal transmitting and receiving operation between a base station and a wireless communication device, according to an embodiment.

The present disclosure provides a method and apparatus for wireless communication. Embodiments of the present disclosure include a wireless communication device configured to transmit channel state information. The wireless communication device may receive, at a user equipment, a reference signal from a base station. According to some embodiments, the wireless communication device may transmit a channel state information reference signal (CSI-RS) to the base station after performing a compression operation. In some cases, the wireless communication device may estimate a first channel between the wireless communication device and the base station based on the reference signal.

Conventional wireless communication device may use a channel information compression technique to transmit channel state information to a base station by using uplink resources. For example, a wireless communication device may compress channel information by utilizing a linear subspace including a large number of channel components. However, when a wireless communication device compresses channel information by using only a linear subspace, the compression performance may be limited.

Accordingly, embodiments of the present disclosure include a wireless communication device compresses the CSI-RS, based on artificial intelligence, using a non-linear subspace for reporting the channel information. The wireless communication device, as described with reference to the present disclosure, may receive a reference signal from a base station and estimate a first channel between the wireless communication device and the base station based on the reference signal.

In some cases, a feature including grouped attributes may be extracted from the estimated first channel based on a first artificial intelligence model. For example, the artificial intelligence model may be trained to reduce a difference between the first channel estimated by the wireless communication device and a second channel estimated by the base station with respect to the first channel. Additionally, the wireless communication device may quantize the feature including the grouped attributes by using a codebook that is based on a second artificial intelligence model. Accordingly, by reducing a difference between the first and second channels and by quantizing the feature including the grouped attributes based on a codebook, embodiments of the present disclosure are able to generate a combination of indices of the codebook for each of the grouped features.

According to some embodiments of the present disclosure, a codebook that is based on a second artificial intelligence model may include a plurality of vector codewords and a plurality of scalar codewords. The second artificial intelligence model may be an artificial intelligence model trained to reduce a difference between a combination of the plurality of vector codewords and the plurality of scalar codewords of the codebook and the quantized features.

Embodiments of the present disclosure include a method of wireless communication device comprising receiving a reference signal from a base station. The device (i.e., user equipment) estimates a first channel between the wireless communication device and the base station based on the reference signal followed by extraction of a feature including the grouped attributes from the first channel, based on a first artificial intelligence model trained to reduce a difference between the first channel estimated by the wireless communication device and a second channel estimated by the base station with respect to the first channel and group attributes. Further, the model quantizes the attributes by using a codebook that is based on the second artificial intelligence model and generates a combination of indices of the codebook for each group of the attributes. Finally, the device transmits a bitstream including combination information of the indices of the codebook to the base station. In some cases, the codebook includes a plurality of vector codewords and a plurality of scalar codewords, and the second artificial intelligence model comprises an artificial intelligence model trained to reduce a difference between a combination of the plurality of vector codewords and the plurality of scalar codewords of the codebook and the quantized attributes.

Embodiments of the disclosure include an apparatus for wireless communication that comprises a base station configured to transmit a reference signal (CSI-RS) to a processor. In some cases, the processor includes a user equipment, wherein the user equipment is configured to estimate a downlink channel between the wireless communication device and the base station based on the reference signal and an artificial intelligence model. Additionally, the user equipment may transmit the estimated channel information to the base station. The wireless communication device also includes a memory for storing the estimated channel information and the artificial intelligence model.

Accordingly, by reducing a difference between the first and second channels and by quantizing the feature including the grouped attributes based on a codebook, embodiments of the present disclosure are able to generate a combination of indices of the codebook for each of the grouped features. Thus, the artificial intelligence model enables transmission of a bitstream including combination information of the indices of the codebook to the base station. In some cases, the wireless communication device may efficiently extract a feature from channel state information by grouping attributes with high correlation, and may reduce a loss that may occur in a quantization process through vector-scalar quantization.

The following detailed description is provided to assist the reader in gaining a comprehensive understanding of the methods, apparatuses, and/or systems described herein. However, various changes, modifications, and equivalents of the methods, apparatuses, and/or systems described herein will be apparent after an understanding of the disclosure of this application. For example, the sequences of operations described herein are merely examples, and are not limited to those set forth herein, but may be changed as will be apparent after an understanding of the disclosure of this application, with the exception of operations necessarily occurring in a certain order. The features described herein may be embodied in different forms and are not to be construed as being limited to the example embodiments described herein. Rather, the example embodiments described herein have been provided merely to illustrate some of the many possible ways of implementing the methods, apparatuses, and/or systems described herein that will be apparent after an understanding of the disclosure of this application.

The present disclosure may be modified in multiple alternate forms, and thus specific embodiments will be exemplified in the drawings and described in detail. In the present specification, when a component (or a region, a layer, a portion, etc.) is referred to as being "on," "connected to," or "coupled to" another component, it means that the component may be directly disposed on/connected to/coupled to the other component, or that a third component may be disposed therebetween.

Like reference numerals may refer to like components throughout the specification and the drawings. It is noted that while the drawings are intended to illustrate actual relative dimensions of a particular embodiment of the specification, the present disclosure is not necessarily limited to the embodiments shown. The term "and/or" includes all combinations of one or more of which associated configurations may define.

It will be understood that, although the terms "first," "second," etc. may be used herein to describe various components, these components should not necessarily be limited by these terms. These terms are only used to distinguish one component from another. For example, a first component could be termed a second component, and, similarly, a second component could be termed a first component, without departing from the scope of the inventive concept. The terms of a singular form may include plural forms unless the context clearly indicates otherwise.

Additionally, terms such as "below," "under," "on," and "above" may be used to describe the relationship between components illustrated in the figures. The terms are used as a relative concept and are described with reference to the direction indicated in the drawings. It should be understood that the terms "comprise," "include," or "have" are intended to specify the presence of stated features, integers, steps, operations, components, parts, or combinations thereof in the disclosure, but do not preclude the presence or addition of one or more other features, integers, steps, operations, components, parts, or combinations thereof.

Embodiments of the present disclosure include a wireless communication configured to receive a reference signal from a base station and estimate a first channel between the wireless communication device and the base station based on the reference signal. The present disclosure is not limited to any particular wireless network and may be applied to wireless communication systems having a similar technical background or channel configuration.

Hereinafter, a wireless communication system of an embodiment of the present disclosure will be described in detail with reference to the accompanying drawings, wherein a wireless communication device uses a deep learning technique for performing nonlinear modeling for channel information reporting.

FIG. 1 illustrates a signal transmitting and receiving operation between a base station and a wireless communication device, according to an embodiment.

Referring to FIG. 1, a wireless communication system 100 may include a base station 110 and a wireless communication device 120. For convenience of description, the wireless communication system 100 is illustrated as including only one base station 110 and one wireless communication device 120. However, this is only an embodiment, and is the embodiments are not limited thereto. Accordingly, a wireless communication system may be implemented to include a plurality of base stations and a plurality of wireless communication devices.

A base station (BS) may be a station that communicates with a wireless communication device and is a subject that allocates communication network resources to the wireless communication device. For example, each base station may provide communication coverage for a particular geographic area. In 3GPP, the term "cell" can refer to a coverage area of the base station and/or a coverage area depending on the context in which the term is used. The base station may include at least one of a cell, a base station (BS), a NodeB (NB), an eNodeB (eNB), and a next generation radio access network (NG RAN), a radio access unit, a base station controller, a node on a network, and a gnodeB (gNB). In NR systems, the term "cell" and NB, next generation NB (gNB), 5G NB, access point (AP), BS, NR BS, or transmission reception point (TRP) may be interchangeable. In some examples, a cell may not necessarily be stationary, and the geographic area of the cell may move according to the location of a mobile base station. In some examples, the base stations may be interconnected to one another and/or to one or more other base stations or network nodes in the wireless network through various types of backhaul interfaces such as a direct physical connection, a virtual network, or the like using any suitable transport network. Base station may provide wireless broadband access to user equipment within coverage thereof.

A wireless communication device is a subject that communicates with a base station or another wireless communication device, and may include at least one of a node, user equipment (UE), next generation UE (NG UE), a mobile station (MS), mobile equipment (ME), a device, and a terminal. User equipment may be mobile and may refer to any devices capable of communicating with base station to transmit and receive data and/or control information.

In addition, the wireless communication device may include at least one of a smartphone, a tablet personal computer (PC), a mobile phone, a video phone, an e-book reader, a desktop PC, a laptop PC, a netbook computer, a personal digital assistant (PDA), a portable multimedia player (PMP), an MP3 player, a medical device, a camera, or a wearable device. In addition, the wireless communication device may include at least one of a television, a digital video disk (DVD) player, an audio system, a refrigerator, an air conditioner, a vacuum cleaner, an oven, a microwave oven, a washing machine, an air purifier, a set-top box, a home automation control panel, a security control panel, a media box (e.g., Samsung HomeSync™, Apple TV™, or Google TV™), a game console (e.g., Xbox™, PlayStation™), an electronic dictionary, an electronic key, a camcorder, or an electronic picture frame.

In addition, the wireless communication device may include at least one of various medical devices (e.g., various portable medical measuring devices (a glucose meter, a heart rate monitor, a blood pressure monitor, or a thermometer), a magnetic resonance angiography (MRA) machine, a magnetic resonance imaging (MRI) machine, a computed tomography (CT) machine, a camera, or ultrasonic equipment), a navigation system, a global navigation satellite system (GNSS), an event data recorder (EDR), a flight data recorder (FDR), an automotive infotainment device, marine electronic equipment (e.g. navigation systems for ships, gyrocompasses, etc.), avionics, security devices, head units for vehicles, industrial or home robots, drones, automated teller machines (ATMs) in financial institutions, point of sales (POS) in stores, or Internet of Things (IoT) devices (e.g., light bulbs, various sensors, sprinklers, fire alarms, thermostats, street lights, toasters, exercise equipment, hot water tanks, heaters, boilers, etc.). The wireless communication device may include various types of multi-media systems capable of performing a communication function.

The base station 110 may be connected to the wireless communication device 120 through a radio channel to provide various communication services. The base station 110 may provide services through a shared channel for user traffic and perform scheduling by collecting status information such as a buffer status, an available transmission power status, and a channel state of the wireless communication device 120. The wireless communication system 100 may support beamforming technology by using orthogonal frequency division multiplexing (OFDM) as radio access technology. In addition, the wireless communication system 100 may support an Adaptive Modulation and Coding (AMC) scheme for determining a modulation scheme and a channel coding rate according to a channel condition of the wireless communication device 120.

Beamforming refers to a technique in signal processing that is used for directional signal transmission or reception. In some cases, beamforming can be performed by combining elements in an antenna array such that signals at particular angles experience constructive interference and the remaining signals experience destructive interference. Beamforming can be performed at the transmitting and receiving sides to control the phase and relative amplitude of the signal at each transmitter. Accordingly, a pattern of constructive and destructive interference is achieved in the wavefront resulting in spatial selectivity.

In cellular communication systems, the quality of a signal received by a UE depends on factors such as distance between the desired and interfering base stations, path loss exponent, log-normal shadowing, short-term fading and noise. In order to improve system capacity, peak data rate and coverage reliability, the signal transmitted to and by a particular user is modified to account for the signal quality variation through a process referred to as link adaptation. Adaptation Modulation and Coding (AMC) provides a link adaptation method that increases the overall system capacity. AMC provides the flexibility to match the modulation-coding scheme to the average channel conditions for each user. In case of AMC, the power of the transmitted signal is constant over a frame interval, and the modulation and coding format is changed to match the current received signal quality or channel conditions. Adaptive modulation systems use channel state information at the transmitter. Adaptive modulation systems enhance rate of transmission, and/or bit error rates, by using the channel state information present at the transmitter.

In addition, the wireless communication system 100 may transmit and receive signals by using a wide frequency band that is in a frequency band of 6 GHz or higher. For example, the wireless communication system 100 may increase a data transmission rate by using a millimeter wave band such as a 28 GHz band or a 60 GHz band. The wireless communication system 100 may support transmission and reception based on a directional beam generated using multiple antennas to secure coverage since the millimeter wave band has a relatively large signal attenuation per distance.

An antenna refers to a wireless device that may include a single antenna or more than one antenna. For example, the antenna may be capable of concurrently transmitting or receiving multiple wireless transmissions. In some cases, a wireless communication device may include an antenna array.

The wireless communication system 100 may include a system supporting multiple input, multiple output (MIMO), and thus, the base station 110 and the wireless communication device 120 may support beamforming technology. Beamforming technology may be classified into digital beamforming, analog beamforming, hybrid beamforming, etc.

Hereinafter, the present disclosure is described based on an embodiment in which a wireless communication system supports hybrid beamforming technology, but the embodiments of the present disclosure are applicable to other beamforming techniques.

Referring again to FIG. 1, the base station 110 may transmit a channel state information-reference signal (CSI-RS) to the wireless communication device 120. The wireless communication device 120 may estimate a downlink channel by using a CSI-RS. The wireless communication device 120 may transmit a bitstream including channel information based on an artificial intelligence model to the base station 110. The wireless communication device 120 may efficiently compress channel information between the wireless communication device 120 and the base station 110 based on the artificial intelligence model and transmit the compressed channel information to the base station 110.

The wireless communication device 120 may utilize a channel information compression technique to accurately transmit channel state information to a base station using relatively small uplink resources. For example, the wireless communication device 120 may compress channel information by using a linear subspace including a large number of channel components. However, when the wireless communication device 120 compresses channel information using only a linear subspace, the compression performance of the wireless communication device 120 may be limited. According to the embodiments of the present disclosure, a method of providing a maximized performance of compression of channel information is provided by considering non-linear characteristics using deep learning for channel information reporting.

Figure 2:
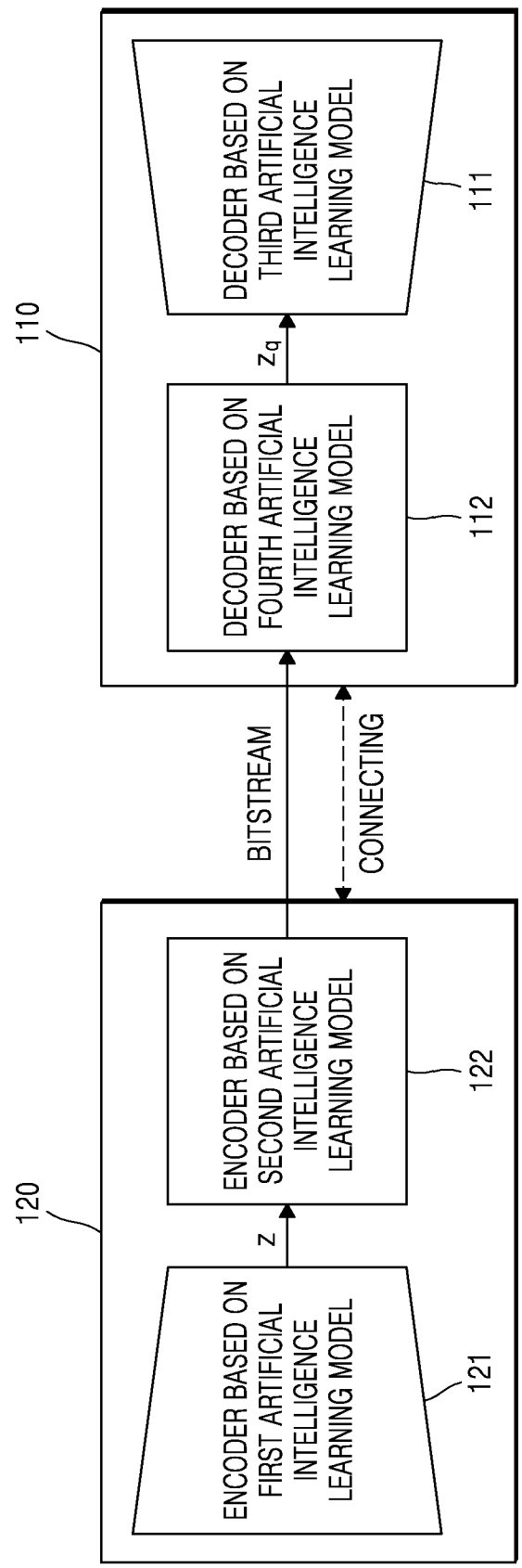
FIG. 2 is a block diagram of a base station and a wireless communication device, according to an embodiment.

FIG. 2 is a block diagram of a base station and a wireless communication device, according to an embodiment.

Referring to FIG. 2, the wireless communication device 120 may include an encoder based on a first artificial intelligence model 121 and an encoder based on a second artificial intelligence model 122. The base station 110 may include a decoder based on a third artificial intelligence model 111 and a decoder based on a fourth artificial intelligence model 112.

Each of the first to fourth artificial intelligence models may be various types of artificial intelligence models. That is, each of the first artificial intelligence model and the second artificial intelligence model may include various types of neural networks. For example, each of the first artificial intelligence model and the second artificial intelligence model may include at least one of a convolutional neural network (CNN), a recurrent neural network (RNN), a dense neural network (DNN), and a fully-connected neural network. In addition, the first to fourth artificial intelligence models may model non-linear relationships.

An ANN is a hardware component or a software component that includes a number of connected nodes (i.e., artificial neurons) that loosely correspond to the neurons in a human brain. Each connection, or edge, transmits a signal from one node to another (like the physical synapses in a brain). When a node receives a signal, it processes the signal and then transmits the processed signal to other connected nodes.

In some cases, the signals between nodes comprise real numbers, and the output of each node is computed by a function of the sum of its inputs. In some examples, nodes may determine their output using other mathematical algorithms, such as selecting the max from the inputs as the output, or any other suitable algorithm for activating the node. Each node and edge are associated with one or more node weights that determine how the signal is processed and transmitted.

In ANNs, a hidden (or intermediate) layer includes hidden nodes and is located between an input layer and an output layer. Hidden layers perform nonlinear transformations of inputs entered into the network. Each hidden layer is trained to produce a defined output that contributes to a joint output of the output layer of the ANN. Hidden representations are machine-readable data representations of an input that are learned from hidden layers of the ANN and are produced by the output layer. As the understanding of the ANN of the input improves as the ANN is trained, the hidden representation is progressively differentiated from earlier iterations.

During a training process of an ANN, the node weights are adjusted to improve the accuracy of the result (i.e., by minimizing a loss which corresponds in some way to the difference between the current result and the target result). The weight of an edge increases or decreases the strength of the signal transmitted between nodes. In some cases, nodes have a threshold below which a signal is not transmitted at all. In some examples, the nodes are aggregated into layers. Different layers perform different transformations on their inputs. The initial layer is known as the input layer and the last layer is known as the output layer. In some cases, signals traverse certain layers multiple times.

A CNN is a class of ANN that is commonly used in computer vision or image classification systems. In some cases, a CNN may enable processing of digital images with minimal pre-processing. A CNN may be characterized by the use of convolutional (or cross-correlational) hidden layers. These layers apply a convolution operation to the input before signaling the result to the next layer. Each convolutional node may process data for a limited field of input (i.e., the receptive field). During a forward pass of the CNN, filters at each layer may be convolved across the input volume, computing the dot product between the filter and the input. During a training process, the filters may be modified so that they activate when they detect a particular feature within the input.

According to an embodiment of the present disclosure, the first artificial intelligence model may refer to an artificial intelligence model used by the wireless communication device 120 to extract features from channel state information. The second artificial intelligence model may refer to an artificial intelligence model used in a process in which the wireless communication device 120 quantizes a feature by using a codebook. The third artificial intelligence model may refer to an artificial intelligence model used in a process in which the base station 110 obtains channel state information from a feature. The fourth artificial intelligence model may refer to an artificial intelligence model used in a process in which the base station 110 obtains a quantized feature from codebook index information of the quantized feature.

The first to fourth artificial intelligence models may be based on different neural networks. For example, the first artificial intelligence model and the second artificial intelligence model may be based on different neural networks and the first artificial intelligence model and the third artificial intelligence model may be based on different neural networks. Also, the third artificial intelligence model and the fourth artificial intelligence model may be based on different neural networks.

According to another example, the first artificial intelligence model and the third artificial intelligence model may be based on a same neural network. That is, the first artificial intelligence model and the third artificial intelligence model may be same as each other. The second artificial intelligence model and the fourth artificial intelligence model may be based on a same neural network. That is, the second artificial intelligence model and the fourth artificial intelligence model may be same as each other.

Thus, the first to fourth artificial intelligence models may be based on different or identical neural networks. Moreover, combinations of neural networks on which the first to fourth artificial intelligence models are based may vary.

The wireless communication device 120 may receive a CSI-RS from the base station 110. The wireless communication device 120 may estimate a downlink channel between the wireless communication device 120 and the base station 110 by using the received CSI-RS. The channel estimated by the wireless communication device 120 may have a matrix form. A matrix for the channel estimated by the wireless communication device 120 may be referred to as a first channel matrix. The first channel matrix may be input to the encoder based on first artificial intelligence model 121.

The encoder based on first artificial intelligence model 121 may receive the first channel matrix as an input. The encoder based on first artificial intelligence model 121 may output a feature variable z including one or more attributes from the first channel matrix based on the first artificial intelligence model. That is, the wireless communication device 120 may extract the feature variable z based on the first artificial intelligence model from the estimated channel information.

For example, the encoder based on first artificial intelligence model 121 may extract the feature z based on the first artificial intelligence model in which two purposes are reflected. The encoder based on first artificial intelligence model 121 may extract the feature variable z based on the first artificial intelligence model that is trained by reflecting a purpose of reducing a difference between the first channel matrix estimated by the wireless communication device 120 and a second channel matrix estimated by the base station 110 based on channel information received from the wireless communication device 120 and reflecting a purpose of grouping attributes of feature variables. The feature z may have a form of a vector or a matrix. A feature variable may be referred to as a feature. The process of extracting the features is described with reference to FIGS. 6 and 7.

According to another example, the encoder based on first artificial intelligence model 121 may extract the feature z based on the first artificial intelligence model that is trained by further reflecting a purpose for selecting attributes based on importance and a purpose of selecting attributes based on density in addition to the purpose of reducing the difference in channel matrices or the purpose of grouping. Accordingly, the wireless communication device 120 may efficiently compress channel state information by using limited uplink resources and transmit the channel state information to the base station 110. The process of attribute selection is described with reference to FIGS. 10A to 10C.

The encoder based on second artificial intelligence model 122 may receive the feature z as an input. The encoder based on second artificial intelligence model 122 may convert the feature z into a bitstream form by quantizing the feature z based on the second artificial intelligence model. The wireless communication device 120 may transmit the bitstream to the base station 110 by using uplink resources.

For example, the encoder based on second artificial intelligence model 122 may quantize groups of attributes of a feature by using a codebook based on the second artificial intelligence model. According to some embodiments, a quantized feature may be expressed as $z_q$. The encoder based on second artificial intelligence model 122 may transmit a bitstream including codebook index information about the quantized feature $z_q$ to the base station 110 by using uplink resources. The quantization process is described in detail with reference to FIG. 8.

The base station 110 may receive the bitstream from the wireless communication device 120. The decoder based on fourth artificial intelligence model 112 may segment the bitstream based on the fourth artificial intelligence model. Also, the decoder based on the fourth artificial intelligence model 112 may obtain, from the bitstream segmented, the feature $z_q$ including quantized attributes by using a codebook based on the fourth artificial intelligence model. The decoder based on fourth artificial intelligence model 112 may transmit the quantized feature $z_q$ to the decoder based on third artificial intelligence model 111.

The decoder based on third artificial intelligence model 111 may obtain a second channel matrix from the quantized feature $z_q$, based on the third artificial intelligence model. A neural network of the third artificial intelligence model may be trained to reduce a difference between the first channel matrix and the second channel matrix.

A set of parameters of the first artificial intelligence model may be expressed as $\phi_E$. A set of parameters of the third artificial intelligence model may be expressed as $\theta_D$.

The wireless communication device 120 and the base station 110 may train the first to fourth artificial intelligence models by repeating the procedures described (i.e., to reduce a difference between the channel matrix). After the training is completed, the wireless communication device 120 and the base station 110 may perform the process based on the first to fourth artificial intelligence models after which the training is completed.

For example, the encoder based on first artificial intelligence model 121 and the decoder based on third artificial intelligence model 111 may be trained to reduce the difference between the first channel matrix and the second channel matrix. In addition, the encoder based on first artificial intelligence model 121 and the decoder based on third artificial intelligence model 111 may be trained such that, among attributes of features extracted from the first channel matrix, attributes with high correlation are grouped into the same group.

Figure 3:
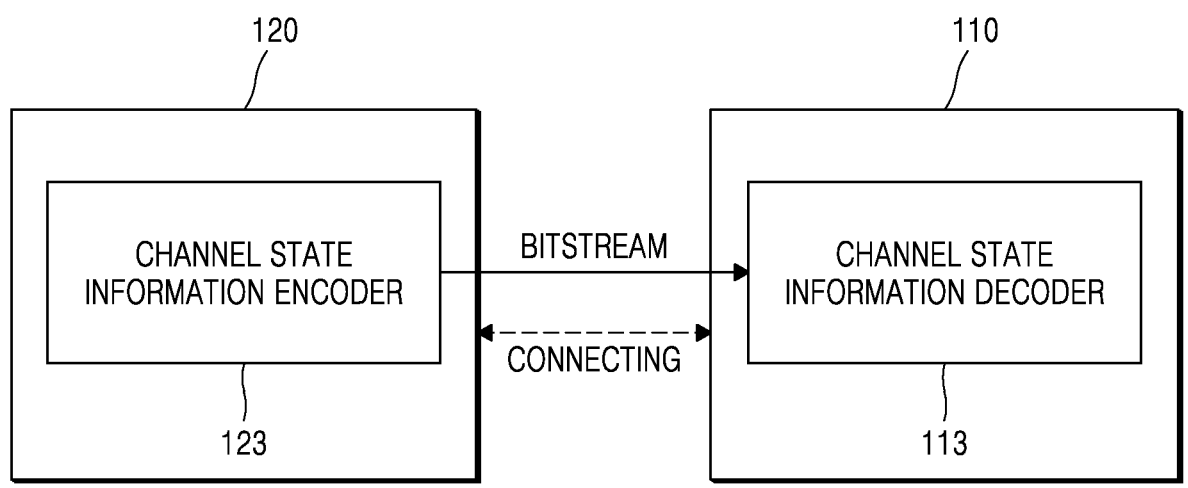
FIG. 3 is a block diagram of a base station and a wireless communication device, according to an embodiment.

FIG. 3 is a block diagram of a base station and a wireless communication device, according to an embodiment. FIG. 3 will be described with reference to FIGS. 1 and 2.

Referring to FIG. 3, the wireless communication device 120 may include a channel state information encoder 123. The base station 110 may include a channel state information decoder 113.

The channel state information encoder 123 may perform operations of the encoder based on first artificial intelligence model 121 and the encoder based on second artificial intelligence model 122.

For example, the channel state information encoder 123 may extract a feature including attributes grouped from a channel state based on the first artificial intelligence model and quantize the feature including the grouped attributes by using a codebook that is based on the second artificial intelligence model.

The channel state information decoder 113 may perform operations of the decoder based on third artificial intelligence model 111 and the decoder based on fourth artificial intelligence model 112.

For example, the channel state information decoder 113 may segment a bitstream received from the wireless communication device 120 based on the fourth artificial intelligence model and obtain a quantized feature by using a codebook based on the fourth artificial intelligence model from the segmented bitstream and obtain channel state information from the quantized feature based on the third artificial intelligence model.

Figure 4:
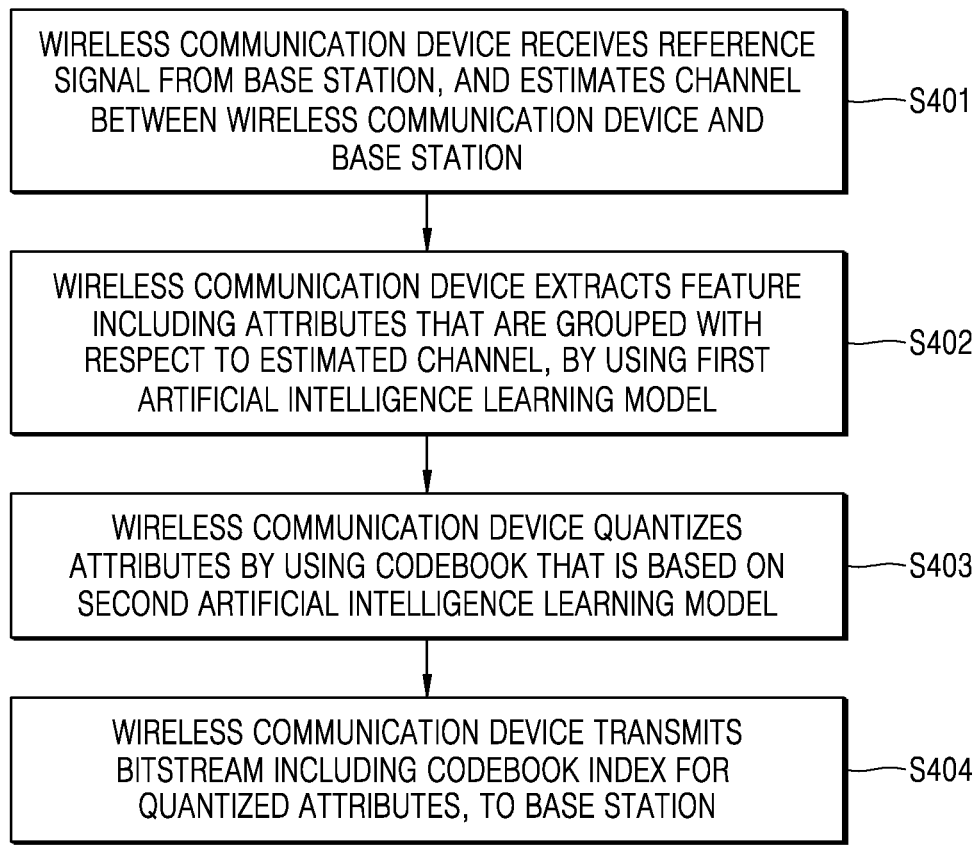
FIG. 4 is a flowchart of an operation procedure of a wireless communication device, according to an embodiment.

FIG. 4 is a flowchart of an operation procedure of a wireless communication device, according to an embodiment.

Referring to FIG. 4, in operation S401, the wireless communication device 120 may receive a reference signal from the base station 110 and estimate a channel between the wireless communication device 120 and the base station 110. For example, the wireless communication device 120 may receive one of a CSI-RS, a synchronization signal block (SSB), a demodulation-reference signal (DM-RS), and a tracking reference signal (TRS) and estimate a channel between the wireless communication device 120 and the base station 110 by using the received signal.

In operation S402, the wireless communication device 120 may extract a feature including attributes that are grouped with respect to the estimated channel by using the first artificial intelligence model. The first artificial intelligence model may be trained to reduce a difference between the first channel estimated by the wireless communication device 120 and the second channel estimated by the base station 110 with respect to the first channel as well as to group the attributes. Further details regarding the training are provided with reference to FIGS. 6 and 7.

In operation S403, the wireless communication device 120 may quantize attributes by using a codebook based on the second artificial intelligence model. A codebook may include a plurality of vector codewords and a plurality of scalar codewords. The second artificial intelligence model may be an artificial intelligence model for reducing a difference between a combination of the plurality of vector codewords and the plurality of scalar codewords of the codebook and the quantized attributes. The quantization process is described with reference to FIG. 8.

In operation S404, the wireless communication device 120 may transmit a bitstream including a codebook index for the quantized attributes, to the base station 110. The wireless communication device 120 may transmit the bitstream to the base station 110 on an uplink channel. That is, the wireless communication device 120 may transmit the bitstream to the base station 110 on at least one of a control channel and a data channel.

For example, the wireless communication device 120 may transmit a bitstream to the base station 110 on a physical uplink control channel (PUCCH). As another example, the wireless communication device 120 may transmit a bitstream on a physical uplink shared channel (PUSCH). As another example, the wireless communication device 120 may transmit a bitstream to the base station 120 on a PUCCH and a PUSCH.

Figure 5:
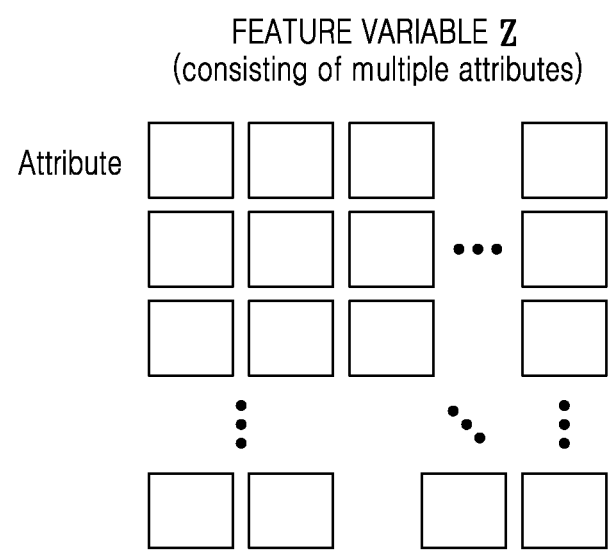
FIG. 5 illustrates an example of features extracted from a channel estimated by a wireless communication device, according to an embodiment.

FIG. 5 illustrates an example of features extracted from a channel estimated by a wireless communication device, according to an embodiment. FIG. 5 will be described with reference to FIGS. 2 and 3.

The encoder based on first artificial intelligence model 121 may receive a first channel matrix as an input. The encoder based on first artificial intelligence model 121 may compress the first channel matrix based on the first artificial intelligence model. Referring to FIG. 5, the encoder based on the first artificial intelligence model 121 may output a feature variable z including various attributes. A feature variable may be referred to as features. Features may be defined as a set of attributes to be learned. During a compression process, attributes may be reflected in a feature variable. Referring to FIG. 5, the form of features is expressed in 2D. However, this is only an embodiment and the form of features may be expressed in various dimensions. The total size may be equal to the number of attributes to be learned.

Figure 6:
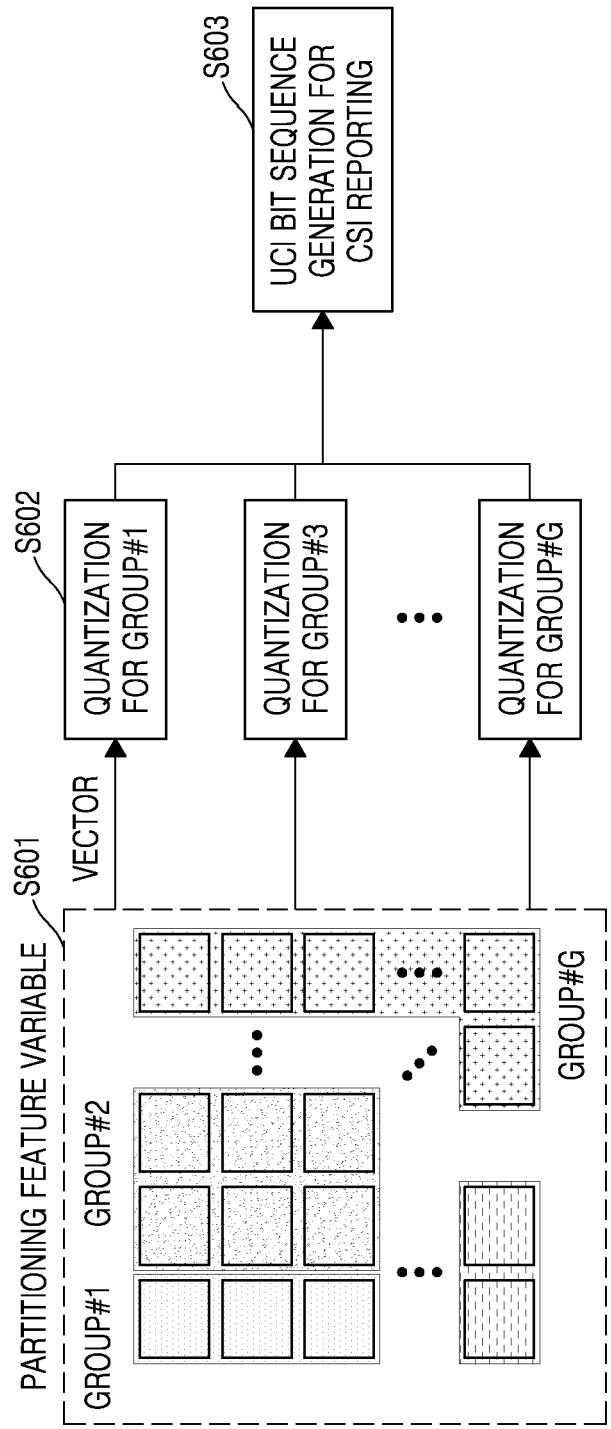
FIG. 6 illustrates an example of an operation procedure of a wireless communication device, according to an embodiment.

FIG. 6 illustrates an example of an operation procedure of a wireless communication device, according to an embodiment. The embodiment of FIG. 6 may be described with reference to FIGS. 1, 2, and 3.

Referring to FIG. 6, in operation S601, the wireless communication device 120 may divide attributes constituting a feature into G groups. The wireless communication device 120 may receive a reference signal from the base station 110 and estimate a channel by using the received reference signal. The wireless communication device 120 may extract features from the estimated channel based on the first artificial intelligence model. The wireless communication device 120 may group the features at the same time while extracting the features.

The wireless communication device 120 may extract grouped features from a first channel matrix based on the first artificial intelligence model having an objective function as shown in Equation 1.

$$(\phi_E, \theta_D) = \|H - \hat{H}\|_F^2 + \lambda f_r(z) \qquad \text{[Equation 1]}$$

In Equation 1, $\phi_E$ may denote a set of parameters of a neural network of the first artificial intelligence model. $\theta_D$ may denote a set of parameters of the neural network of the third artificial intelligence model. H may denote the first channel matrix of a downlink channel between the base station 110 and the wireless communication device 120 estimated by the wireless communication device 120. $\hat{H}$ may denote the second channel matrix of a downlink channel between the base station 110 and the wireless communication device 120 estimated by the base station 110 based on features received from the wireless communication device 120. In some cases, an objective function of the third artificial intelligence model may be same as Equation 1.

The first term of Equation 1 may be set such that the base station 110 accurately estimates a downlink channel between the wireless communication device 120 and the base station 110. That is, the first term may be set to reduce a difference between the first channel matrix and the second channel matrix. The first term may correspond to the channel matrix recovery performance of the base station 110, and various metrics such as mean squared error (MSE) may be used. However, the first term is not limited to the described embodiment.

The second term of Equation 1 includes λ as a hyperparameter and may be adjusted in a training process of a neural network. λ may determine a weight of each of the first term and the second term.

The second term of Equation 1 may be set to reduce a correlation between the groups. For example, the second term of Equation 1 may be expressed as Equation 2.

$$f_r(z) = \Sigma_{i \neq j} \|z(i)^T z(j)\|_F \qquad \text{[Equation 2]}$$

In Equation 2, z(i) may indicate an i-th group in a feature.

After the wireless communication device 120 completes training of the first artificial intelligence model and the base station 110 completes training of the third artificial intelligence model (i.e., based on Equations 1 and 2) from among features output based on the first artificial intelligence model by the wireless communication device 120, attributes having high correlation may be grouped and correlation between the respective groups may be relatively low.

In operation S602, the wireless communication device 120 may perform quantization for each group. In operation S603, the wireless communication device 120 may generate an uplink control information (UCI) bit sequence for CSI reporting.

Figure 7:
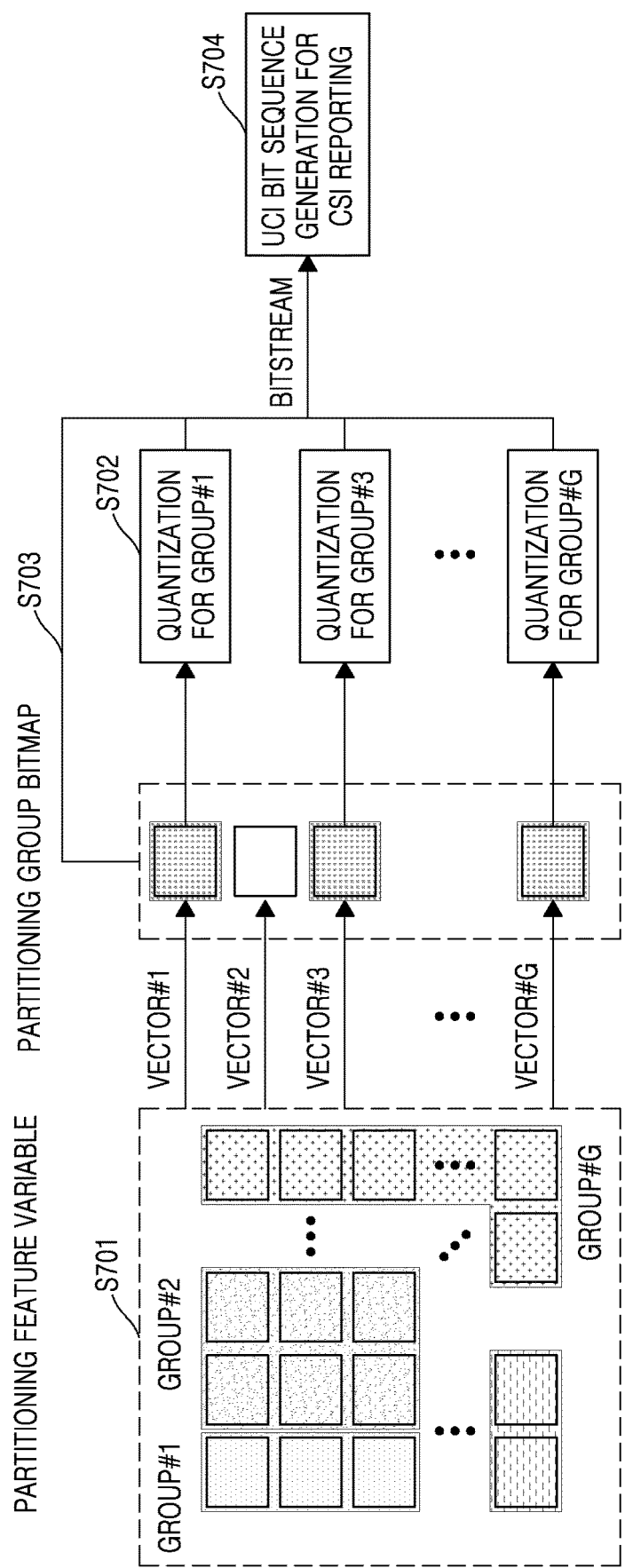
FIG. 7 illustrates an example of an operation procedure of a wireless communication device, according to an embodiment.

FIG. 7 illustrates an example of an operation procedure of a wireless communication device according to an embodiment. FIG. 7 may be described with reference to FIGS. 1, 2, and 3. Description of the details with reference to FIG. 6 may be omitted here.

Referring to FIG. 7, in operation S701, the wireless communication device 120 may divide attributes constituting a feature into G groups. In operation S702, the wireless communication device 120 may perform quantization for each group.

After the wireless communication device 120 segments the feature by grouping the same when the wireless communication device 120 quantizes the feature by using a codebook, feedback overhead may increase according to the codebook size.

In operation S703, the wireless communication device 120 may determine whether or not to transmit each group to the base station 110 based on a bitmap. That is, the wireless communication device 120 may determine whether to provide feedback for each group. The wireless communication device 120 may turn on/off the bitmap. For example, on/off operations may be performed through Equation 3 below.

$$\text{bitmap}(i) = \begin{cases} 1, & \text{if } |z(i)^T z(i)| \geq \delta \text{ or } |z(i, a)|^2 \geq \epsilon, \forall a \\ 0, & \text{else} \end{cases} \qquad \text{[Equation 3]}$$

In operation S704, the wireless communication device 120 may generate an UCI bit sequence for CSI reporting. For example, the wireless communication device 120 may quantize only groups corresponding to positions where the bitmap is turned on. In addition, the wireless communication device 120 may transmit a bitstream including codebook index information of the quantized groups to the base station 110.

Figure 8:
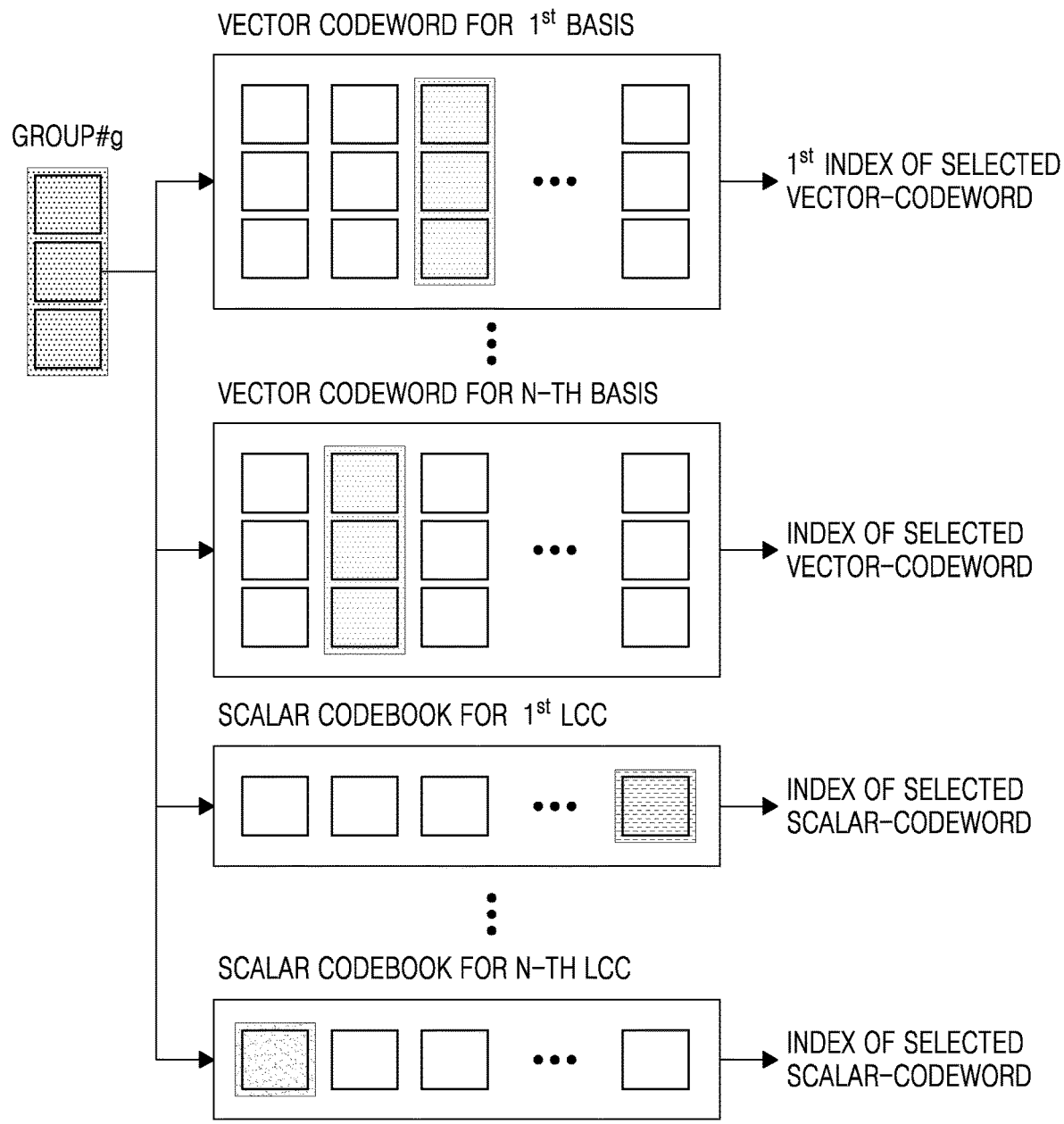
FIG. 8 illustrates quantization of grouped features according to an embodiment.

FIG. 8 illustrates quantization of grouped features according to an embodiment. The embodiment of FIG. 8 may be described with reference to FIGS. 1, 2, and 3.

Referring first to FIG. 2, the wireless communication device 120 may extract a feature including grouped attributes, through the encoder based on first artificial intelligence model 121. The wireless communication device 120 may quantize the feature by using a codebook that is based on the second artificial intelligence model.

According to an embodiment of the present disclosure, a codebook may refer to a codebook that includes one or more vector codewords and one or more scalar codewords. A set of vector codewords may be referred to as a vector codebook and a set of scalar codewords may be referred to as a scalar codebook. Referring to FIG. 8, a codebook may include N vector codewords and N scalar codewords. N may be set to any integer including 1. N may be adaptively adjusted according to at least one of the amounts of feedback information and uplink resources of the wireless communication device 120 by at least one of the wireless communication devices 120 and the base station 110. N may be different for each group.

Referring to FIG. 8, codebook index selection for a g-th group is shown, an index of a first selected vector codeword is 3, and an index of an N-th selected vector codeword is 2. In addition, an index of a first selected scalar codeword is a number corresponding to a last index, and an index of an N-th selected scalar codeword is 1. However, N may be different for each group and is not limited to the described embodiment.

The wireless communication device 120 may select codebook indices closest to the feature by using a codebook that is based on the second artificial intelligence model. That is, the encoder based on second artificial intelligence model 122 of the wireless communication device 120 may select indices of a codebook such that a difference between a result of a linear combination of N vector codewords and N scalar codewords and the feature z is the smallest.

An objective function of the second artificial intelligence model for codebook index selection may be expressed as Equation 4 below.

$$\{c_n(g), v_n(g)\} = \underset{c'_n v'_n \in C}{\operatorname{argmin}} \|z(g) - \Sigma_n c'_n v'_n\|_2^2 \qquad \text{[Equation 4]}$$

Referring to Equation 4, c may define codewords in a scalar codebook. v may define codewords in a vector codebook. $z(g)$ may indicate a feature output by the encoder 121 that is included in the wireless communication device 120 and is based on the first artificial intelligence model. An output of quantization may include a combination of selected indices. The wireless communication device 120 may pack a combination of indices into a bitstream form. The wireless communication device 120 may transmit a bitstream to the base station 110 by using uplink resources. The base station 110 may obtain quantized features by using a codebook agreed with the wireless communication device 120. A combination of indices selected as an output of quantization may be expressed using Equation 5. An objective function of the fourth artificial intelligence model may also be expressed as in Equation 4.

$$z_q(g) = \Sigma_n c_n(g) v_n(g) \qquad \text{[Equation 5]}$$

Codebook information designed in advance may be shared between the wireless communication device 120 and the base station 110. For example, parameters of a codebook may be updated during a training process of the first to fourth artificial intelligence models and after the training is completed, the wireless communication device 120 and the base station 110 may share the codebook including the updated parameters.

Unlike the codebook including one or more vector codewords and one or more scalar codewords, the wireless communication device 120 may perform quantization by using a codebook including only one or more vector codewords. For example, the wireless communication device 120 may determine which codebook to use among a codebook including vector codewords and one or more scalar codewords and a codebook including only one or more vector codewords, by considering a channel state and uplink resources, or the like. When the wireless communication device 120 uses a codebook including only one or more vector codewords, c in Equation 5 may always be 1.

Figure 9:
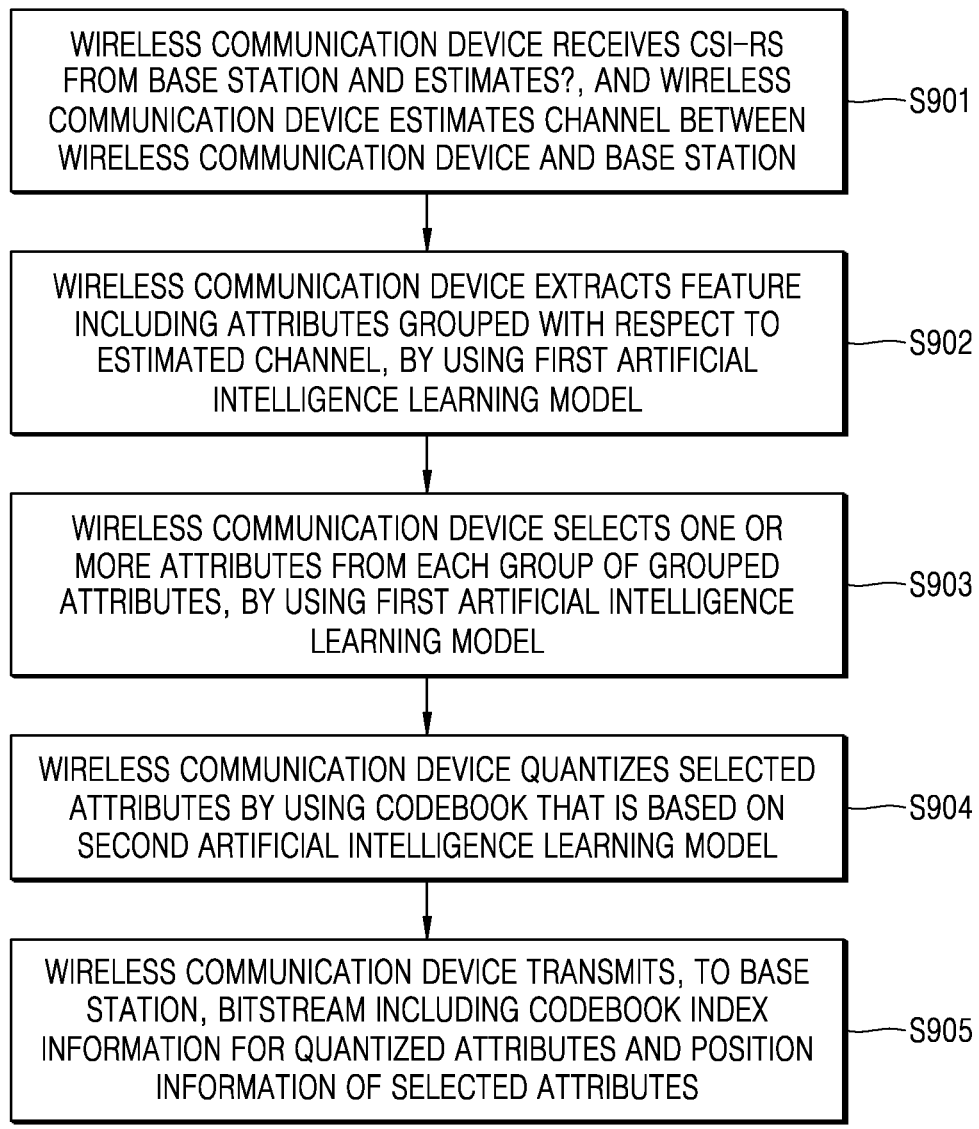
FIG. 9 is a flowchart of an operation procedure of a wireless communication device, according to an embodiment.

FIG. 9 is a flowchart of an operation procedure of a wireless communication device, according to an embodiment. FIG. 9 may be described with reference to FIGS. 1, 2, and 3.

Referring to FIG. 9, in operation S901, the wireless communication device 120 may receive a CSI-RS from the base station 110 and the wireless communication device 120 may estimate a channel between the wireless communication device 120 and the base station 110.

In operation S902, the wireless communication device 120 may extract a feature including attributes grouped with respect to the estimated channel by using the first artificial intelligence model.

In operation S903, the wireless communication device 120 may select one or more attributes from each group of grouped attributes by using the first artificial intelligence model.

In operation S904, the wireless communication device 120 may quantize the selected attributes by using a codebook that is based on the second artificial intelligence model. Also, the wireless communication device 120 may generate a bitstream for the quantized attributes based on the second artificial intelligence model. A neural network of the second artificial intelligence model may be trained based on the codebook update and bitstream generation.

In operation S905, the wireless communication device 120 may transmit, to the base station 110, a bitstream including codebook index information for the quantized attributes and position information of the selected attributes.

Figure 10A:
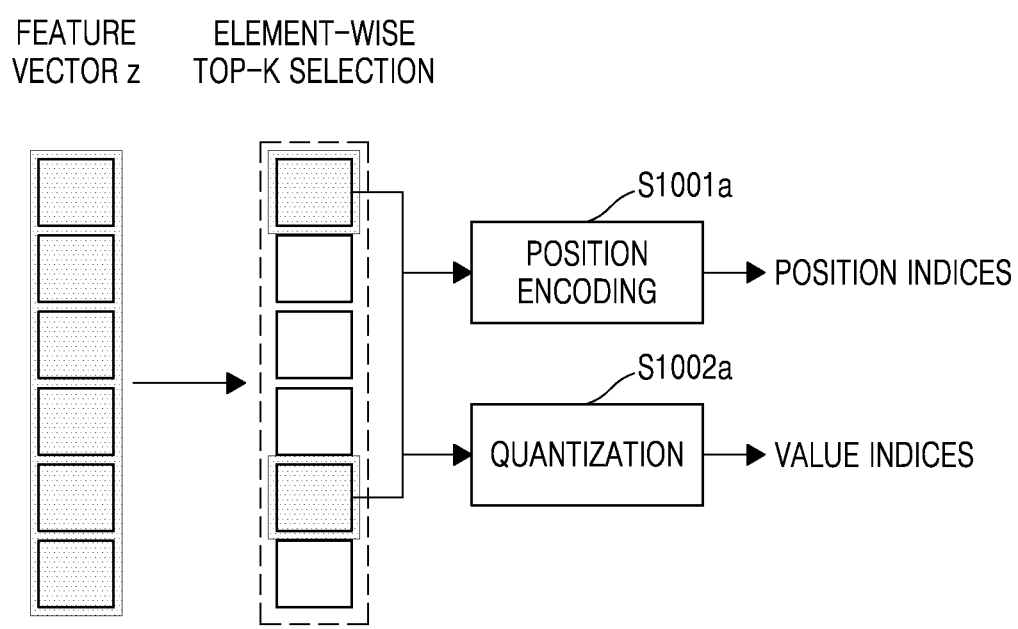
FIG. 10A illustrates an example of a quantization process according to an embodiment.
Figure 10B:
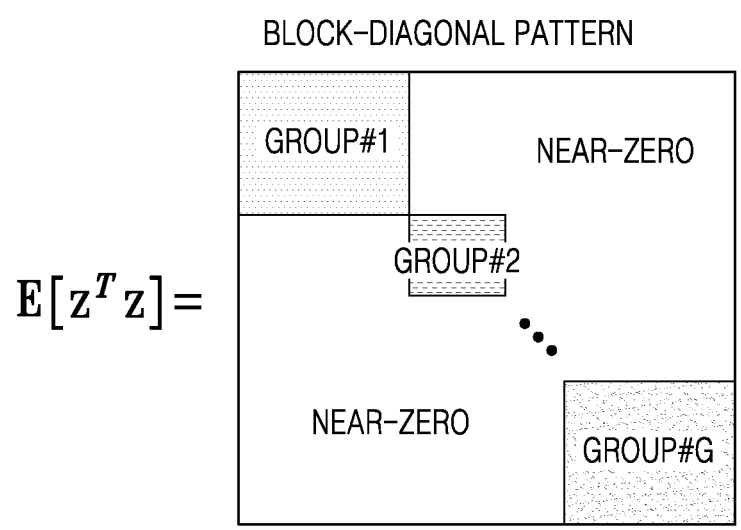
FIG. 10B illustrates attributes that are grouped, and diagonalized based on their importance, according to an embodiment.

FIG. 10A illustrates an example of quantization, according to an embodiment. FIG. 10B illustrates attributes that are grouped and diagonalized according to importance, according to an embodiment. The embodiment of FIG. 10A may be described with reference to FIGS. 1, 2, and 9.

The wireless communication device 120 may be trained to group attributes of a channel state, based on the first artificial intelligence model. Referring to FIG. 10A, a feature vector z may have one group including one or more attributes. The wireless communication device 120 may be trained to select some attributes from among one or more attributes of each group, based on the first artificial intelligence model.

According to an embodiment, the wireless communication device 120 may select a first attribute and a fifth attribute and transmit a bitstream including index information and a position information of quantization values of the selected attributes to the base station 110. In operation S1001a, the wireless communication device 120 may perform position encoding. That is, the wireless communication device 120 may include position information about the selected attributes in the bitstream. In operation S1002a, the wireless communication device 120 may calculate a combination of codebook indices corresponding to the quantization values of the selected attributes and include the combination information of the codebook indices, in the bitstream.

The wireless communication device 120 may select K attributes in units of blocks. K is a positive integer. The wireless communication device 120 may transmit, to the base station 110, a bitstream including scalar-vector quantized values of the selected K attributes and position information. A block unit may be information agreed between the wireless communication device 120 and the base station 110.

The wireless communication device 120 may select attributes for various purposes in a training process. The wireless communication device 120 selects attributes based on the first artificial intelligence model in the training process using Equation 6.

$$J(\phi_E, \theta_D) = \|H - \hat{H}\|_F^2 + \lambda_1 f_{r1}(z) + \lambda_2 f_{r2}(z) + \lambda_3 f_{r3}(z) \quad \text{[Equation 6]}$$

In Equation 6, the first term has the same objective as the first term of Equation 1. That is, the first term is for reducing a difference between a second channel matrix estimated by the base station 110 and a first channel matrix estimated by the wireless communication device 120. The second term of Equation 6 may have the same objective as the second term of Equation 1. That is, the second term is for reflecting grouping of attributes with high correlation in the first artificial intelligence model. The second term may be in various forms, for example, the second term may have a form as Equation 7 or Equation 8. Herein, $\lambda_1$, $\lambda_2$, and $\lambda_3$ may denote a weight of each term. In some cases, an objective function of the third artificial intelligence model may be expressed using Equation 6.

$$\lambda_1 f_{r1}(z) = \Sigma_{i \neq j} \left| [z^T z]_{i,j} \right| \quad \text{[Equation 7]}$$

$$f_{r1}(z) = \max_{i \neq j} [z^T z]_{i,j} \quad \text{[Equation 8]}$$

Referring to Equation 6, the third term is to reflect importance of attributes within a feature to the first artificial intelligence model. That is, the wireless communication device 120 may select attributes from each group based on importance. At least one of the wireless communication device 120 and the base station 110 may set the importance. For example, the wireless communication device 120 may reflect average power of the attributes in a training process. In some cases, the third term may have, for example, a form as shown in Equation 9.

$$f_{r2}(z) = \Sigma_i \left| [z^T z]_{i,i} - [D]_{i,i} \right| \quad \text{[Equation 9]}$$

Referring to Equation 9, the third term may reflect average power errors of the attributes to the first artificial intelligence model. $[D]_{i,i}$ may indicate a diagonal matrix. Diagonal components of $[D]_{i,i}$ may be the attributes set by the wireless communication device 120 or the base station 110.

Referring to FIG. 10B and Equation 6, after the wireless communication device 120 and the base station 110 complete training based on the first, second, and third terms, the wireless communication device 120 may identify a form of a matrix (e.g., a covariance matrix or an auto-correlation matrix) of a feature extracted from the first channel matrix. That is, the correlation between groups is low and the groups may be derived in the form of a diagonal matrix.

Referring again to FIG. 10A, the wireless communication device 120 may train, using the fourth term of Equation 6, the first artificial intelligence model such that the feature has a sparse attribute. That is, the wireless communication device 120 may train the first artificial intelligence model considering the density of the attributes. The fourth term may have forms as shown in Equations 10, 11, 12, and 13. However, the forms of the fourth term are not limited to these equations and the fourth term may have various forms without being limited to embodiments of the forms.

The wireless communication device 120 may be trained to select non-zero values in the group. For example, the wireless communication device 120 may select a non-zero value from a group by using Equation 10.

$$f_{r3}(z) = \|z\|_0 \quad \text{[Equation 10]}$$

Referring to Equation 10, the double bar may indicate a norm. That is, for $\|z\|_0$, 0 may indicate a $L^0$ norm. Values other than 0 may be referred to as activated attributes and the wireless communication device 120 may reflect the number of activated attributes in a training process of the first artificial intelligence model using Equation 10.

$$f_{r3}(z) = \|z\|_1 \quad \text{[Equation 11]}$$

Referring to Equation 11, the double bar may indicate a norm. That is, for $\|z\|_1$, 1 may indicate a $L^1$ norm. The wireless communication device 120 may reflect a sum of activated attribute values in the training process of the first artificial intelligence model using Equation 11.

$$f_{r3}(z) = \|z - \text{supp\_}K(z)\|_2 \quad \text{[Equation 12]}$$

Referring to Equation 12, the double bar may indicate a norm. That is, for $\|z - \text{supp\_}K(z)\|_2$, 2 may indicate a $L^2$ norm. Additionally, supp_K(z) may be a function in which an attribute having an approximate value of 0 is considered 0. The wireless communication device 120 may train the first artificial intelligence model by reflecting attributes having a relatively large value based on Equation 12.

$$f_{r3}(z) = \|[\|z(1)\|_2, \ldots, \|z(B)\|_2]^T\|_0 \quad \text{[Equation 13]}$$

Referring to Equation 13, the double bar may indicate a norm. The wireless communication device 120 may train the first artificial intelligence model by reflecting a number of activated attribute blocks based on Equation 13.

$$f_{r3}(z) = \|[\|z(1)\|_2, \ldots, \|z(B)\|_2]^T\|_1 \quad \text{[Equation 14]}$$

Referring to Equation 14, the double bar may indicate a norm. The wireless communication device 120 may train the first artificial intelligence model by reflecting a sum of activated attribute blocks based on Equation 14.

$$f_{r3}(z) = \|z - \text{supp\_block\_}K(z)\|_2 \quad \text{[Equation 15]}$$

Referring to Equation 15, the double bar may indicate a norm. Additionally, supp_block_K(z) may be a function in which a block having an approximate value of 0 is considered 0. The wireless communication device 120 may train the first artificial intelligence model by reflecting attribute blocks having a relatively large value based on Equation 15.

The wireless communication device 120 and the base station 110 may be trained, using a learning process, by considering both, i.e., a purpose of reducing a difference between the first channel matrix and the second channel matrix and for grouping based on a correlation of each attribute. The wireless communication device 120 and the base station 110 may be additionally trained by considering the purpose of selecting some of the grouped attributes, and the criterion for selecting some of the grouped attributes may be variously described with reference to Equations 10 to 15.

The wireless communication device 120 may select and use terms from among second to fourth terms of Equation 6. That is, the wireless communication device 120 may determine an objective function of the first artificial intelligence model based on the feedback overhead and uplink resources.

For example, the wireless communication device 120 may perform only grouping on attributes by selecting only the first term and the second term as shown in Equation 1. As another example, the wireless communication device 120 may group attributes by selecting the first term, the second term, and the fourth term, and select attributes having a non-zero value in each group. The wireless communication device 120 may transmit, to the base station 110, a bitstream including position information on selected attributes and index information on quantized values of the selected attributes.

Figure 10C:
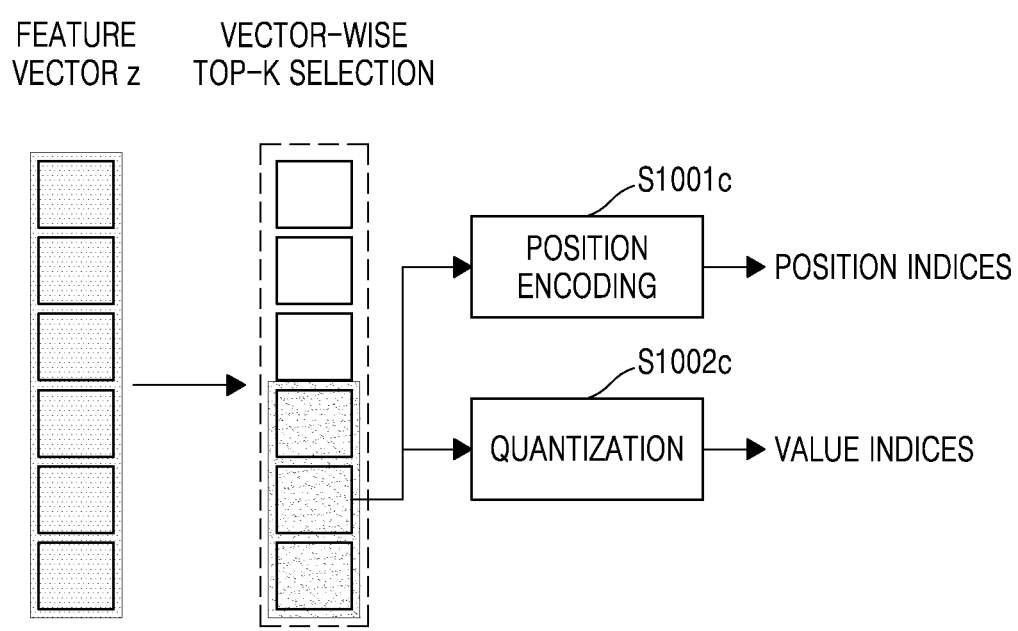
FIG. 10C illustrates an example of a quantization process according to an embodiment.

FIG. 10C illustrates an example of quantization according to an embodiment. FIG. 10C may be described with reference to FIGS. 1, 2, 3, 10A, and 10B.

Referring to FIG. 10C, the wireless communication device 120 may be trained to group attributes of a channel state based on the first artificial intelligence model. A feature vector z may have one group including one or more attributes. The wireless communication device 120 may be trained to select some attributes from among one or more attributes of each group based on the first artificial intelligence model. Thus, the wireless communication device 120 may select continuous attributes. Referring to FIG. 10C, the wireless communication device 120 may select fourth to sixth attributes. The wireless communication device 120 may transmit, to the base station 110, a bitstream including position information and quantization value index information of the selected attributes.

In operation S1001c, the wireless communication device 120 may perform position encoding. That is, the wireless communication device 120 may include position information about the selected attributes, in the bitstream. In operation S1002c, the wireless communication device 120 may calculate a combination of codebook indices corresponding to quantization values of the selected continuous attributes and include the combination information of the codebook indices in the bitstream.

Figure 11:
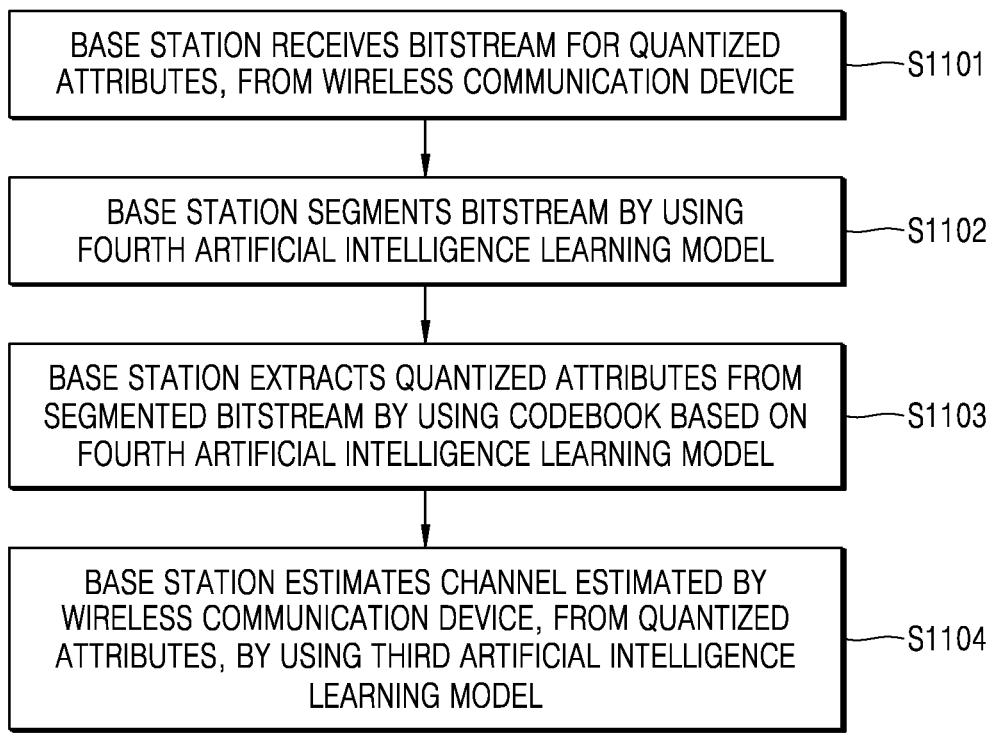
FIG. 11 is a flowchart of an operation procedure of a base station, according to an embodiment.

FIG. 11 is a flowchart of an operation procedure of a base station, according to an embodiment.

Referring to FIG. 11, in operation S1101, the base station 110 may receive a bitstream for quantized attributes, from the wireless communication device 120. For example, the base station 110 may receive a bitstream including information about a combination of codebook indices for the quantized attributes, from the wireless communication device 120.

In operation S1102, the base station 110 may segment the bitstream by using the fourth artificial intelligence model. For example, the base station 110 may segment the bitstream based on the fourth artificial intelligence model. In some examples, the fourth artificial intelligence model may be trained with respect to bitstream segmentation and codebook update.

In operation S1103, the base station 110 may extract the quantized attributes from the segmented bitstream by using a codebook based on the fourth artificial intelligence model.

In operation S1104, the base station 110 may estimate a channel estimated by the wireless communication device 120 from the quantized attributes by using the third artificial intelligence model.

The base station 110 may train the third artificial intelligence model and the fourth artificial intelligence model by repeating the described procedures. After the training is complete, the base station 110 may use the third artificial intelligence model and the fourth artificial intelligence model, for which the parameter update is completed.

Figure 12:
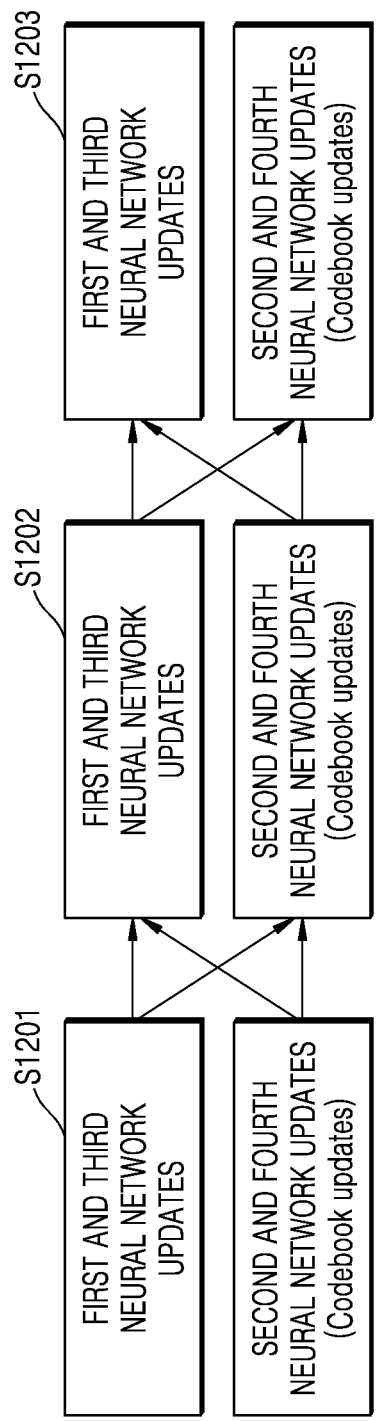
FIG. 12 illustrates a procedure of a wireless communication device and a base station, according to an embodiment.

FIG. 12 illustrates a learning procedure of a wireless communication device and a base station, according to an embodiment. The embodiment of FIG. 12 may be described with reference to FIGS. 1, 2, and 3.

Referring to FIG. 12, S1201 represents an i-th learning step, S1202 represents an i+1th learning step, and S1203 represents an i+2th learning step.

In each operation, the encoder based on first artificial intelligence model 121 and the decoder based on third artificial intelligence model 111 may be trained in a training process by considering a purpose of reducing a difference between the first channel matrix and the second channel matrix and a purpose of grouping based on the correlation of each attribute. The encoder based on first artificial intelligence model 121 and the decoder based on third artificial intelligence model 111 may respectively update parameters of the neural networks of the first artificial intelligence model and the third artificial intelligence model. The first artificial intelligence model and the third artificial intelligence model may be identical to or different from each other.

The encoder based on first artificial intelligence model 121 and the decoder based on the third artificial intelligence model 111 may be additionally trained by considering the purpose of selecting some of the grouped attributes. The criteria for selecting some of the grouped attributes may be variously described.

The encoder based on second artificial intelligence model 122 and the decoder based on the fourth artificial intelligence model 112 may be trained in a training process by considering a purpose of reducing a difference between a feature z and a combination of vector-scalar codewords. The encoder based on second artificial intelligence model 122 and the decoder based on fourth artificial intelligence model 112 may update parameters of the second artificial intelligence model and the fourth artificial intelligence model, respectively. That is, the encoder based on second artificial intelligence model 122 and the decoder based on fourth artificial intelligence model 112 may each update a codebook. The second artificial intelligence model and the fourth artificial intelligence model may be identical to or different from each other.

Referring to FIG. 12, the networks of the first and third artificial intelligence models and the networks of the second and fourth artificial intelligence models may be updated in parallel. The networks of the second and fourth artificial intelligence models may be neural networks for codebook updating.

Figure 13:
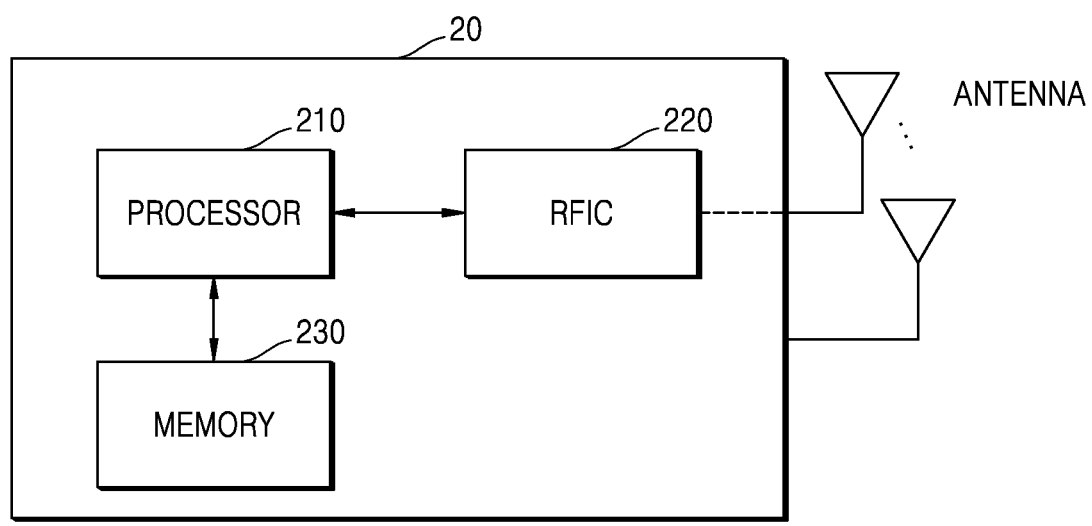
FIG. 13 is a block diagram illustrating a wireless communication device, according to an embodiment.

FIG. 13 is a block diagram illustrating a wireless communication device according to an embodiment. FIG. 13 may be described with reference to FIGS. 1, 2, and 3.

Referring to FIG. 13, a wireless communication device 20 may include a processor 210, a radio frequency integrated circuit (RFIC) 220, and a memory 230. For convenience of explanation, one processor 210, one RFIC 220, and one memory 230 are illustrated. However, the processor, the RFIC, and the memory in the wireless communication device may be plural and are not limited to the described embodiment. The processor 210 may control the RFIC 220 and the memory 230 and may be configured to implement the operating method and operation flowcharts of the wireless communication device 20.

The wireless communication device 20 may include a plurality of antennas, and the RFIC 220 may transmit and receive radio signals through one or more antennas. At least some of the plurality of antennas may correspond to transmission antennas. The transmission antenna may transmit a radio signal to an external device other than the wireless communication device 20 (e.g., other than UE or BS). At least some of the remaining antennas may correspond to reception antennas. A reception antenna may receive a radio signal from the external device.

According to an embodiment of the present disclosure, the processor 210 of the wireless communication device 20 may receive a reference signal from a base station through the RFIC 220. In some cases, the wireless communication device 20 may correspond to the wireless communication device 120 as described with reference to FIGS. 1-3. The processor 210 may estimate a first channel between the wireless communication device 20 and the base station 110 based on the reference signal. The processor 210 may reduce a difference between the first channel estimated by the wireless communication device 20 and a second channel estimated by the base station 110 with respect to the first channel and extract from the first channel, based on the first artificial intelligence model that is trained to group attributes, a feature including the grouped attributes.

The first artificial intelligence model that is trained to reduce a difference between the first channel estimated by the wireless communication device 20 and a second channel estimated by the base station 110 with respect to the first channel, and group attributes may be stored in the memory 230. The processor 210 may quantize the attributes by using a codebook based on the second artificial intelligence model and generate a combination of indices of the codebook for each group of the attributes. The processor 210 may transmit a bitstream including combination information of the indices of the codebook to the base station 110 through the RFIC 20. A codebook may include a plurality of vector codewords and a plurality of scalar codewords. The second artificial intelligence model may be an artificial intelligence model trained to reduce a difference between a combination of the plurality of vector codewords and the plurality of scalar codewords of the codebook and the quantized attributes. The trained second artificial intelligence model may be stored in the memory 230.

According to an example embodiment, the processor 210 of the wireless communication device 20 may receive a bitstream including information about a combination of codebook indices for the quantized attributes from another wireless communication device 120 through the RFIC 220. In some cases, the wireless communication device 20 may correspond to the base station 110. The processor 210 may reduce a difference between a first channel estimated by the wireless communication device 120 and a second channel estimated by the wireless communication device 20 with respect to the first channel and segment the bitstream by using the third artificial intelligence model trained to group attributes. The RFIC 220 may extract the quantized attributes from the segmented bitstream by using a codebook based on the fourth artificial intelligence model. The processor 210 may obtain the second channel from the quantized attributes by using the third artificial intelligence model. The quantized attributes may be the grouped attributes that are extracted from the first channel based on the first artificial intelligence model and quantized based on a codebook based on the second artificial intelligence model. A codebook may include a plurality of vector codewords and a plurality of scalar codewords. The second artificial intelligence model may be an artificial intelligence model for reducing a difference between a combination of the plurality of vector codewords and the plurality of scalar codewords of the codebook and the quantized attributes.

Figure 14:
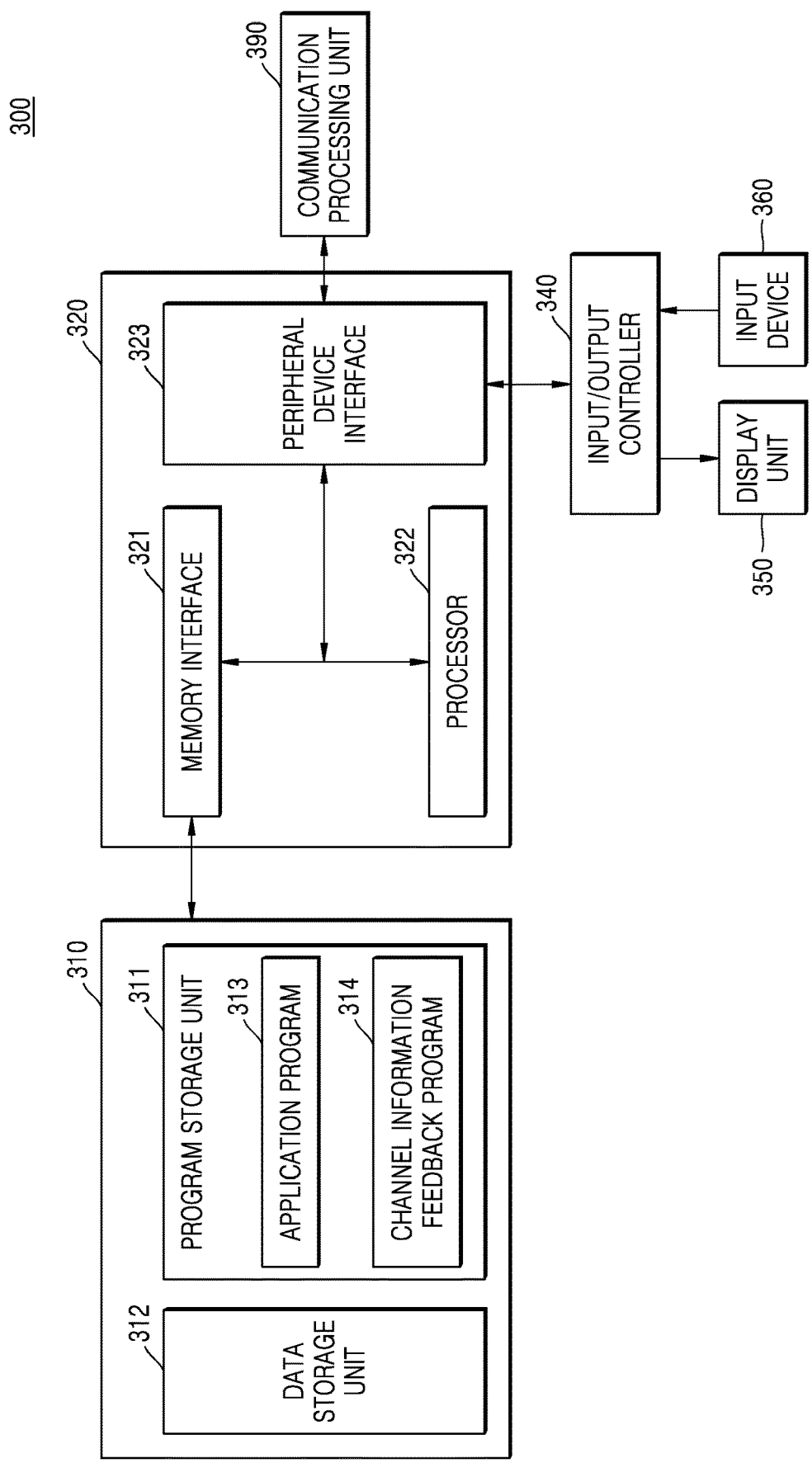
FIG. 14 is a block diagram illustrating an electronic device, according to an embodiment.

FIG. 14 is a block diagram illustrating an electronic device according to an embodiment. Referring to FIG. 14, an electronic device 300 may include a memory 310, a processor unit 320, an input/output controller 340, a display unit 350, an input device 360, and a communication processing unit 390. Herein, a plurality of memories 310 may be included.

The memory 310 may include a program storage unit 311 for storing a program to control an operation of an electronic device and a data storage unit 312 for storing data generated during program execution. The data storage unit 312 may store data for the operation of an application program 313 and a channel information feedback program 314. The program storage unit 311 may include the application program 313 and the channel information feedback program 314. In some cases, the program included in the program storage unit 311 may be expressed as an instruction set as a set of instructions.

The application program 313 includes an application program that operates in an electronic device. That is, the application program 313 may include instructions of an application driven by a processor 322. The channel information feedback program 314 may be a program for transmitting channel state information as described with reference to FIGS. 1 to 12.

A peripheral device interface 323 may control a connection between an input/output peripheral device of a base station and the processor 322 and a memory interface 321. The processor 322 controls the base station to provide a corresponding service by using at least one software program. In some cases, the processor 322 may execute at least one program stored in the memory 310 to provide a service corresponding to the corresponding program.

The input/output controller 340 may provide an interface between an input/output device such as the display unit 350 and the input device 360 and the peripheral device interface 323. The display unit 350 displays status information, input text, a moving picture, a still picture, and the like. For example, the display unit 350 may display application program information driven by the processor 322.

The input device 360 may provide input data generated by selection of an electronic device, to the processor unit 320 through the input/output controller 340. In some cases, the input device 360 may include a keypad including at least one hardware button and a touch pad that detects touch information. For example, the input device 360 may provide touch information, such as a touch detected through a touch pad, a touch movement, or a touch release, to the processor 322 through the input/output controller 340. The electronic device 300 may include a communication processing unit 390 that performs communication functions for voice communication and data communication.

While the inventive concept has been particularly shown and described with reference to exemplary embodiments thereof, it will be understood by those of ordinary skill in the art that various changes in form and details may be made therein without departing from the spirit and scope of the inventive concept as defined by the following claims.

The processes discussed above are intended to be illustrative and not limiting. One skilled in the art would appreciate that the steps of the processes discussed herein may be omitted, modified, combined, and/or rearranged, and any additional steps may be performed without departing from the scope of the invention. More generally, the above disclosure is meant to be exemplary and not limiting. Only the claims that follow are meant to set bounds as to what the present invention includes. Furthermore, it should be noted that the features and limitations described in any one embodiment may be applied to any other embodiment herein, and flowcharts or examples relating to one embodiment may be combined with any other embodiment in a suitable manner, done in different orders, or done in parallel. In addition, the systems and methods described herein may be performed in real time. It should also be noted, the systems and/or methods described above may be applied to, or used in accordance with, other systems and/or methods.

What is claimed is:

1. A method of a wireless communication device, the method comprising:
   receiving a reference signal from a base station;
   estimating a first channel between the wireless communication device and the base station based on the reference signal;
   extracting, based on a first artificial intelligence model trained to reduce a difference between the first channel estimated by the wireless communication device and a second channel estimated by the base station, a feature including grouped attributes from the estimated first channel;
   quantizing the grouped attributes using a codebook that is based on a second artificial intelligence model by generating one or more indices of the codebook for each group of the attributes; and
   transmitting, to the base station, a bitstream including combination information of the indices of the codebook,
   wherein the codebook includes a plurality of vector codewords and a plurality of scalar codewords, and the second artificial intelligence model comprises an artificial intelligence model trained to reduce a difference between a combination of the plurality of vector codewords and the plurality of scalar codewords of the codebook and the quantized attributes.

2. The method of claim 1, wherein the first artificial intelligence model is trained to group attributes having high correlation.

3. The method of claim 1, wherein the first artificial intelligence model is trained based on an importance of the grouped attributes.

4. The method of claim 1, wherein the first artificial intelligence model is trained based on a density of the grouped attributes.

5. The method of claim 4, wherein the first artificial intelligence model is trained to select attributes that are greater than 0 from each group of the grouped attributes.

6. The method of claim 4, further comprising selecting one or more attributes from each group of the attributes, based on the first artificial intelligence model, wherein the combination information of the indices of the codebook is based on a quantization value of the selected one or more attributes from each group of the attributes and position information of the selected one or more attributes.

7. The method of claim 1, further comprising selecting, based on a bitmap, some groups from among the groups, wherein the combination information of the indices of the codebook comprises information corresponding to one or more of the selected groups.

8. The method of claim 1, wherein the bitstream is transmitted on an uplink channel.

9. The method of claim 1, further comprising:
   receiving, by the base station, the bitstream;
   segmenting, by the base station, the bitstream using a fourth artificial intelligence model;
   obtaining, by the base station, the quantized attributes using a codebook based on the fourth artificial intelligence model;
   obtaining, by the base station, the second channel with respect to the first channel that is estimated by the wireless communication device using a third artificial intelligence model from the quantized attributes;
   wherein, before the wireless communication device performs operations with the base station,
   parameters of the first artificial intelligence model and the second artificial intelligence model are updated as the wireless communication device trains the first artificial intelligence model and the second artificial intelligence model, and
   parameters of the third artificial intelligence model and the fourth artificial intelligence model are updated as the base station trains the third artificial intelligence model and the fourth artificial intelligence model.

10. The method of claim 9, wherein the first artificial intelligence model and the second artificial intelligence model are trained in parallel, and
    the third artificial intelligence model and the fourth artificial intelligence model are trained in parallel.

11. The method of claim 1, wherein the reference signal comprises any one of a channel state information-reference signal (CSI-RS), a synchronization signal block (SSB), a demodulation-reference signal (DM-RS), and a tracking reference signal (TRS).

12. The method of claim 1, wherein the first artificial intelligence model and the second artificial intelligence model comprise non-linear relationships.

13. A method of a wireless communication device comprising:
    receiving a reference signal from a base station;
    estimating a first channel between the wireless communication device and the base station based on the reference signal;
    extracting, based on a first artificial intelligence model trained to reduce a difference between the first channel estimated by the wireless communication device and a second channel estimated by the base station, a feature including grouped attributes from the estimated first channel;
    generating one or more indices of a codebook for each group of the attributes by quantizing the grouped attributes using the codebook based on a second artificial intelligence model; and
    transmitting, to the base station, a bitstream including the indices of the codebook,
    wherein the codebook comprises a plurality of vector codewords, wherein the second artificial intelligence model comprises an artificial intelligence model trained to reduce a difference between a combination of the plurality of vector codewords of the codebook and the quantized attributes.

14. The method of claim 13, wherein the first artificial intelligence model is trained to group attributes having high correlation.

15. The method of claim 13, wherein the first artificial intelligence model is trained based on an importance of the grouped attributes.

16. The method of claim 13, wherein the first artificial intelligence model is trained based on a density of the grouped attributes.

17. The method of claim 16, wherein the first artificial intelligence model is trained to select attributes that are greater than 0 from each group of the grouped attributes.

18. The method of claim 16, further comprising selecting one or more attributes from each group of the attributes, based on the first artificial intelligence model,
wherein combination information of the indices of the codebook is based on a quantization value of the selected one or more attributes from each group of the attributes and position information of the selected one or more attributes.

19. The method of claim 13, further comprising selecting, based on a bitmap, some groups from among the groups,
wherein combination information of the indices of the codebook is based on at least one of the selected groups.

20. A method of a base station comprising:
receiving, from a wireless communication device, a bitstream including information about one or more codebook indices for quantized attributes;
segmenting, by the base station, the bitstream using a second artificial intelligence model;
extracting, by the base station, the quantized attributes from the segmented bitstream using a codebook based on the second artificial intelligence model; and
obtaining, by the base station, a second channel from the quantized attributes using a first artificial intelligence model for reducing a difference between a first channel estimated by the wireless communication device and a second channel estimated by the base station,
wherein the codebook includes a plurality of vector codewords and a plurality of scalar codewords, and the second artificial intelligence model comprises an artificial intelligence model for reducing a difference between a combination of the plurality of vector codewords and the plurality of scalar codewords of the codebook and the quantized attributes.

* * * * *